United States Patent [19]

Paleari

[11] Patent Number: 5,622,780
[45] Date of Patent: Apr. 22, 1997

[54] MICROWAVEABLE MULTILAYER FILMS WITH METAL-LIKE APPEARANCE

[75] Inventor: Mario Paleari, Pogliano Milanese, Italy

[73] Assignee: W. R. Grace & Co.-Conn., Duncan, S.C.

[21] Appl. No.: 434,827

[22] Filed: May 4, 1995

[30] Foreign Application Priority Data

May 11, 1994 [EP] European Pat. Off. .............. 94201350

[51] Int. Cl.$^6$ ...................................................... B32B 5/16
[52] U.S. Cl. .......................... 428/328; 428/329; 428/403
[58] Field of Search ................................... 428/329, 328, 428/403

[56] References Cited

U.S. PATENT DOCUMENTS

| | | | |
|---|---|---|---|
| 4,469,742 | 9/1984 | Oberle et al. | 428/215 |
| 4,640,856 | 2/1987 | Ferguson et al. | 428/36 |
| 4,833,007 | 5/1989 | Huang | 428/242 |
| 4,871,613 | 10/1989 | Akao | 428/328 |
| 4,985,300 | 1/1991 | Huang | 428/332 |
| 5,110,855 | 5/1992 | Blatz | 524/441 |
| 5,206,075 | 4/1993 | Hodgson | 428/216 |
| 5,241,031 | 8/1993 | Mehta | 526/348 |
| 5,272,236 | 12/1993 | Lai et al. | 526/348 |
| 5,278,272 | 1/1994 | Lai et al. | 526/348 |

FOREIGN PATENT DOCUMENTS

| | | |
|---|---|---|
| 0217252 | 4/1987 | European Pat. Off. . |
| 0251770 | 1/1988 | European Pat. Off. . |
| 0369808 | 5/1990 | European Pat. Off. . |
| 0485847 | 5/1991 | European Pat. Off. . |
| 4137139 | 5/1995 | Germany . |
| WO9003414 | 5/1990 | WIPO . |
| WO9303093 | 2/1993 | WIPO . |

*Primary Examiner*—H. Thi Le
*Attorney, Agent, or Firm*—Mark B. Quatt

[57] ABSTRACT

A microwaveable multilayer film with metal-like appearance, comprises at least a sealing layer, an inner layer, and an outer abuse layer, the film including from 0.05 to 2.5% by weight, based on the total weight of the film, of aluminum powder in finely divided form, dispersed in at least one layer selected from the inner and the outer abuse layers.

13 Claims, 1 Drawing Sheet

MICROWAVEABLE MULTILAYER FILMS WITH METAL-LIKE APPEARANCE

FIELD OF THE INVENTION

This invention relates to a microwaveable multilayer film with metal-like appearance, and the use thereof for packaging food products and consumer articles.

More particularly, this invention relates to a heat shrinkable or thermoformable, microwaveable and multilayer film with metal-like appearance, comprising at least a sealing layer, an inner layer, and an outer abuse layer, which comprises from about 0.05 to about 2.5% by weight, based on the weight of the overall film, of aluminum powder in finely divided form, dispersed in at least one layer selected from the inner and the outer abuse layers.

BACKGROUND OF THE INVENTION

Multilayer laminates comprising an aluminum foil or an aluminum metallized substrate and one or more thermoplastic films have been known for a long time.

The advantages of aluminum are barrier to gasses and light, and a typical agreeable glossy metallic appearance.

However, it is impossible to use aluminum foil or aluminum metallized substrates in shrinkable structures. In turn, thermoformation is possible only to a very limited extent exclusively when the metallized substrate is a thermoplastic resin.

in addition, packages made from multilayer laminates comprising an aluminum foil or an aluminum metallized substrate cannot be used in microwave ovens, owing to electrostatic discharges and electric arc formation in the oven.

Another drawback is the difficulty to maintain a high level of barrier due to the formation of pin-holes particularly when the package is submitted to abuse during handling and transportation.

A further drawback of aluminum foil is that there is a concern about the recyclability and the incineration of the structures containing it.

DE-A-4 137 139 discloses a non-shrinkable and non-thermoformable thermoplastic film comprising from 0.1 to 6% by weight of a metal powder selected from the group consisting of aluminum, magnesium, zinc and manganese. This film is used in the manufacture of a laminate comprising an aluminum foil and has the aim of increasing the resistance of said aluminum foil to aggressive agents.

U.S. Pat. No. 4,985,300 describes a heat resistant microwave transparent base film which is first oriented and then coated with a layer of microwave susceptor material. The microwave susceptor material which is applied in a substantially continuous layer by means of conventional coating methods such as vacuum deposition and solution coating, should not be so thick to completely prevent penetration of microwave energy to the interior of the packaged food but should be used in amount sufficient to cause the film to heat under microwave cooking conditions to provide browing and crisping of the surface while providing a degree of microwave shielding for the interior of the food to avoid its overcooking. The method of applying the microwave coating must be one which does not expose the heat shrinkable film to high temperatures; otherwise the film will shrink during processing.

The Applicants are not aware of any heat shrinkable or thermoformable, substantially microwave-transparent multilayer film with metal-like appearance.

OBJECTS OF THE INVENTION

In accordance with the above, a first object of this invention is to provide a heat-shrinkable or thermoformable microwaveable multilayer film with metal-like appearance.

A second object of this invention is to provide a heat-shrinkable or thermoformable gas-barrier, microwaveable, multilayer film with metal-like appearance.

A third object of the present invention is to provide a tubular, heat-shrinkable, optionally gas barrier, microwaveable, multilayer film food casing with metal-like appearance.

A fourth object is to provide bags, pouches and tubings by heat-sealing to itself a heat-shrinkable, optionally gas-barrier, microwaveable, multilayer film with metal-like appearance.

Another object of this invention is to provide a package wherein an article is wrapped and sealed or clipped into a shrunk, optionally barrier, microwaveable and multilayer film having metal-like appearance.

A further object of this invention is to provide a package wherein an article is placed in a cavity obtained in a thermoformed film and sealed under vacuum or a modified atmosphere either by disposing a substantially non-forming web over said cavity as a lid or by molding down upon and around the article a highly forming web.

These and other objects are achieved by the film disclosed hereinbelow.

DEFINITIONS

Unless otherwise stated in this description and in the claims, the following symbols, terms and expressions have the meanings indicated hereinbelow.

The expression "metallized substrate" means a substrate, such as paper or a thermoplastic film, coated with an almost monomolecular layer obtained by metallization under vacuum.

The term "film" means a flat and flexible material having a thickness of at least 5 microns, typically of from 20 to 350 microns. As used herein the term "film" is intended to mean also those flat, thermoformable flexible or rigid articles otherwise known as "laminates".

The expression "heat shrinkable film" means an oriented film which shrinks by at least 10% in at least one direction at 85° C.

The term "microwaveable" or "substantially microwave-transparent" means a structure capable of being crossed by at least 70%, preferably 80% of the microwaves generated by a microwave oven without negatively interfering therewith.

The term "thermoformable film" means a film suitable to be used in a vacuum or compressed air forming or plug-assist vacuum or compressed air forming method. In a vacuum or compressed air forming method, a thermoformable film is heated, for example, by a contact plate and sucked against the plate by applying a vacuum or pushed against the plate by means of compressed air; once heated, the thermoformable film is pushed by atmospheric pressure or by compressed air or by applying a vacuum down into a preformed mold. In a plug-assist vacuum or compressed air forming method, after the thermoformable film has been heated and sealed across a mold cavity, a plug shape similar to the mold shape impinges on the thermoformable film and, upon application of vacuum, the thermoformable film transfers to the mold surface. Thermoforming is a popular method of packaging food products. The food product is placed in the cavity obtained in the thermoformed film and either a substantially non-forming web is disposed over the cavity as a lid and the packages are sealed under vacuum or under modified atmosphere according to conventional techniques, or a highly forming web is molded down upon and around the product and sealed against the thermoformed rigid support by differential air pressure using the vacuum skin packaging technique.

Preferably, however, as used herein the term "thermoformable film" is intended to refer to a rigid thermoformable sheet which is thermoformed by the above conventional methods, to provide a tray or an otherwise shaped rigid support.

The term "cook-in" means a packaging material structurally capable of withstanding exposure to cook-in time-temperature conditions while containing a food product. Cook-in time-temperature conditions typically refer to a long slow cooking, for example submersion in water at 70°–80° C. for 4–6 hours. Submersion at 80° C. for 12 hours probably represents the limiting case. Under such conditions, a packaging material properly characterized as cook-in will maintain seal integrity and will be delamination resistant. Additionally, the packaging film is preferably heat shrinkable under these conditions so as to form a tightly fitting package.

In the present description, unless specifically set forth or otherwise limited, the terms "polymer" or "polymer resin" generally include, but are not limited to, homopolymers, copolymers, such as, for example, block, graft, random, and alternating copolymers, terpolymers etc. and blends and modifications thereof. Furthermore, unless otherwise specifically limited, the terms "polymer" or "polymer resin" shall include all possible steric structure of the material. These structures include but are not limited to, isotactic, syndiotactic, atactic and random arrangements.

The term "sealing" layer is intended to refer to a "skin" or "surface" layer that should be heat-sealable to itself wherein the term "skin" or "surface" layer means a layer of a multilayer film which comprises a surface thereof.

The term "inner" layer as used herein refers to an interior layer of a multilayer film which is not a skin or surface layer nor a gas-barrier layer.

The term "outer abuse" layer as used herein refers to the skin layer of a multilayer film which is intended to be used as the outside abuse-resistant layer and not as the innermost heat-sealable layer.

The term "barrier" layer refers to a layer of a polymer or a polymer blend relatively impermeable to gas.

As used herein the term "polyolefin" refers to thermoplastic polymers obtained by polymerization or copolymerization of relatively simple ($C_2$–$C_{12}$) olefins which may contain other comonomers wherein the olefin units are however present in higher amounts with respect to the other comonomers; including, but not limited to, homopolymers, copolymers, terpolymers, blends and modifications of such relatively simple olefins.

Polyolefins specifically included therein are homopolymers such as polyethylene and polypropylene, copolymers such as propylene copolymers, ethylene-alpha-olefin copolymers either heterogeneous or homogeneous, ethylene-vinylacetate copolymers, and ethylene-acrylate or ethylenemethacrylate copolymers.

The term "polyethylene" as used herein refers to a family of resins obtained by polymerizing the gas ethylene, $C_2H_4$. By varying the catalysts and methods of polymerization, properties such as density, melt index, crystallinity, degree of branching and molecular weight distribution can be regulated over wide ranges.

Polyethylenes having densities below about 0.925 g/cm$^3$ are called low density polyethylenes (LDPE), those having densities ranging from about 0.926 g/cm$^3$ to about 0.940 g/cm$^3$ are called medium density polyethylene (MDPE) and those having densities ranging from about 0.941 g/cm$^3$ to about 0.965 g/cm$^3$ and over are called high density polyethylenes (HDPE).

The molecular structure of conventional LDPE is highly branched. While conventional MDPE possess a molecular structure which is branched, the degree of branching is less than that of conventional LDPE. The molecular structure of HDPE possesses little or no side branching.

The term "polypropylene" refers to a thermoplastic resin obtained by homopolymerizing propylene units according to know processes. The term "propylene copolymers" refers to a propylene copolymer with ethylene and/or butene-1 wherein the propylene units are present in a higher amount than the ethylene and/or butene-1 units.

As used herein the expression "heterogeneous ethylene-alpha-olefin copolymer" refers to polymerization reaction products of ethylene with one or more alpha-olefin comonomers containing from 4 to 8 carbon atoms, preferebly selected from the group comprising linear copolymers or terpolymers of ethylene with one or more of butene-1, 4-methyl-pentene-1, hexene-1, or octene-1, characterized by a relatively wide varation in molecular weight and composition distribution, i.e. polymers prepared for example, using conventional Ziegler-Natta catalysts. Such polymers typically contain a relatively wide variety of chain lengths and comonomer percentages, As used herein the term "VLDPE" or the expression "very low density polyethylene" refer to a heterogeneous copolymer of ethylene with one or more ($C_4$–$C_8$)-alpha-olefin having a density $\leq 0.915$ g/cc, Typically the density of such a VLDPE will be of from about 0.890 g/cc to about 0.915 g/cc, and preferably of from about 0.900 g/cc to about 0.915 g/cc.

As used herein the term "LLDPE" or the expression "linear low density polyethylene" refer to a heterogeneous copolymer of ethylene and one or more ($C_4$–$C_8$-alpha-olefin having a density of from about 0.915 g/cc to about 0.925 g/cc.

As used herein the term "LMDPE" or the expression "linear medium density polyethylene" refer to a heterogeneous copolymer of ethylene and one or more ($C_4$–$C_8$)-alpha-olefin having a density in the range of from about 0.926 to about 0.940 g/cc.

The melt flow index of linear low, medium and very low density polyethylenes generally ranges from between about 0.1 to about 10 grams for ten minutes, preferably from about 0.5 to about 3.0 grams for ten minutes. Linear low, medium and very low density polyethylene resins of this type are commercially avaible or can be manufactured by known methods.

As used herein the expression "homogeneous ethylene-alpha-olefin copolymers" refers to polymerisation reaction products having a relatively narrow molecular weight distribution and relatively narrow composition distribution. Such polymers exhibit a relatively even sequencing of comonomers within a chain, the mirroring of sequence distribution in all chains and the similarity of length of all chains, and are typically prepared using metallocene or other single site type catalysts. More particularly, homogeneous ethylene-alpha-olefin copolymers may be characterized by one or more methods known to those skilled in the art, such as molecular weight distribution ($M_w/M_n$), or composition distribution breadth index (CDBI). The molecular weight distribution, also known as polydispersity, may be determined by gel permeation chromatography. The homogeneous ethylene-alpha-olefin copolymers useful in the present invention generally have a ($M_w/M_n$) of less than about 3, preferably less than about 2.7, and even more preferably comprised between about 1.9 and about 2.5. The CDBI of such homogeneous ethylene-alpha-olefin copolymer will generally be grater than about 60 percent. The CDBI is defined as the percent of the copolymer molecules having a comonomer content within 50 percent (i.e. plus or minus 50%) of the median total molar comonomer content. The CDBI of a polyethylene homopolymer, which does not contain a comonomer, is defined to be 100%. The CDBI is determined via the technique of Temperature Rising Elution Fractionation (TREF) as described for istance by Wild et al. in J. Poly. Sci. Poly. Phys. Ed. 20, p. 441 (1982). Preferably the homogeneous ethylene-alpha-olefin copolymers have a CDBI greater than about 65 and more preferably greater than 70%. Examples of processes for preparing homogeneous ethylene-alpha-olefin copolymers are disclosed in U.S. Pat. No. 5,206,075, U.S. Pat. No. 5,241,031, and WO-A-9303093. Further details regarding the production of homogeneous ethylene-alpha-olefin copolymers are disclosed in WO-A-9003414. Another genus of homogeneous ethylene-alpha-olefin copolymers is disclosed in U.S. Pat. No. 5,272,236 and U.S. Pat. No. 5,278,272.

The term "ethylene vinyl acetate copolymer" (EVA) as used herein refers to a copolymer formed from ethylene and vinyl acetate monomers wherein the ethylene derived units in the copolymer are present in major amounts and the vinyl acetate derived units in the copolymer are present in minor amounts.

As used herein, the term "ethylene-acrylate or ethylene-methacrylate copolymer" refers to the product obtained by copolymerization of ethylene with acrylate monomers of formula

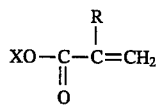

wherein R is hydrogen or methyl group and X is hydrogen, ($C_1$–$C_4$)alkyl or a metal cation, preferably selected from $Na^+$ and $Zn^{++}$, wherein the ethylene units are present in a higher amount than the acrylate units.

The term "modified polyolefin" means polyolefin as defined above characterized by the presence of functional groups such as ketone, carboxylic acid and/or anhydryde groups, these last groups being preferred.

The term "ethylene/vinyl alcohol copolymer" or "EVOH" means a hydrolyzed EVA copolymer, preferably hydrolyzed to a degree of at least 50%, more preferably at least 99%. The mole % of vinyl acetate is generally at least 25%, preferably at least 29%, higher proportions of vinyl acetate and higher degree of hydrolysis giving improved barrier properties.

The term "PVDC", as used herein, refers to a vinylidene chloride copolymer wherein a major amount of the copolymer comprises vinylidene chloride and a minor amount of the copolymer comprises one or more unsaturated monomers copolymerizable therewith. Examples of unsaturated monomers copolymerizable with the vinylidene chloride are vinyl chloride, acrylonitrile, and alkyl acrylates.

The term "polycarbonate" essentially refers to linear thermoplastic polyesters of carbonic acid with aliphatic, cycloaliphatic or aromatic dihydroxy compounds.

The term "polyester" generally refers to heterochain polymeric compounds possessing a plurality of carboxylate ester groups as components of their skeletal structures, and as used herein said term refers to ring-containing polyesters and co-polyesters, such as poly(ethylene terephthalate), poly(ehylene 2,5-dimethyl terephthalate), poly(1,4-cyclohexylene terephthalate), and the like esters particularly those with a high degree of crystallinity.

The term "polystyrene" refers to those polymers which are obtainable by polymerization of styrene or styrene derivatives, e.g. divinylbenzene, vinyltoluene, and alpha-methylstyrene, or co-polymerization of the above monomers with other vinyl co-monomers e.g. butadiene, acrylonitrile, methyl methacrylate, maleic anhydride, and the like comonomers, as well as to the rubber-modified polystyrenes (impact-resistant polystyrenes).

The term "polyamide" means high molecular weight polymers having amide linkages along the molecular chain, and refers more specifically to synthetic polyamides such as various nylons. The polyamides may contain a small amount of a nucleating agent such as talc.

SUMMARY OF THE INVENTION

It has now been found that incorporation of from about 0.05 to about 2.5% by weight based on the weight of the overall film of aluminum powder into one or more layers selected from the inner and the outer abuse layers of a heat-shrinkable or a thermoformable, multilayer structure, comprising at least a sealing layer, an inner layer, and an outer abuse layer, results in a structure which has an agreeable metal-like appearance, further characterized by the fact that the structure maintains its basic properties, sealability, mechanical properties and shrinkability or thermoformability, respectively and, when it contains a gas-barrier layer, also its gas barrier properties, and can be easily microwaved.

Therefore this invention relates to a microwaveable multilayer film with metal-like appearance, comprising at least a sealing layer, an inner layer, and an outer abuse layer, characterized in that from about 0.05 to about 2.5% by weight based on the weight of the overall film of aluminum powder in finely divided form is dispersed in one or more layers selected from the inner and the outer abuse layers.

According to a preferred embodiment of the present invention said aluminum powder is dispersed in the inner layer(s).

Typically, the aluminum powder has a small particle size. Typical particle size distributions of suitable aluminum powders are e.g. 90% less than 20 microns and 50% less than 10 microns, preferably 90% less than 18 microns and 50% less than 7 microns, even more preferably 90% less than 15 microns and 50% less than 6 microns, to allow a fine dispersion thereof into the resin.

Preferably the film will comprise from about 0.1 to about 2.0 by weight of aluminum powder, more preferably from about 0.1 to about 1.5 and even more preferably from about 0.15 to about 1%.

Advantageously the film will also comprise, in addition to the aluminum powder, up to about 2%, preferably up to about 1%, e.g. up to about 0.1% by weight, based on the overall weight of the film, of mica platelets dispersed in the same layer(s) as the aluminum powder.

The layer(s) comprising aluminum powder may further comprise titanium dioxide in an amount up to about 8%, preferably up to about 4%, e.g. up to about 2% by weight based on the weight of the overall film.

According to a preferred embodiment of the present invention however, mica platelets and titanium dioxide are preferably dispersed in the same layer(s) as the aluminum powder in the form of titanium dioxide-coated mica platelets. In such a case the amount of titanium dioxide-coated mica may be up to about 15% by weight, based on the weight of the overall film. Preferably said amount is comprised in the range of from about 1% to about 10% by weight.

The addition of mica platelets coated with a smooth, thin and uniform layer of titanium dioxide in fact enhances the sparkling effect provided by the aluminum powder thus greatly improving the film appearance. The particle size range of these titanium dioxide-coated mica particles is generally up to 20 microns and preferably up to 15 microns. While the particle size range determine the overall, structured glitter or satin sheen effect, the thickness of the titanium dioxide coating may produce different perlescent colors, from silver through yellow, red, and blue, to green. Said perlescent pigments are available for instance from The Mearl Corporation (U.S.A.).

Alternatively, if a metallized color different from silver is desired, it can also be obtained by the use—in addition to the aluminum powder and the titanium dioxide-coated mica platelets providing for the silver color—of a conventional organic pigment in suitable proportions. Typically said organic pigments may be present in an amount of up to about 2.5% by weight based on the weight of the overall film. As an example the addition of a suitable combination of yellow and red organic pigments gives a gold-like appearance to an otherwise silver-like structure.

According to a preferred embodiment the heat-shrinkable, or thermoformable, microwaveable, multilayer film of this invention comprises a gas-barrier layer. Additional layers such as tie layers or bulk layers may also be present.

A typical structure of a heat-shrinkable film according to the present invention will comprise a sealing layer, an inner layer, an optional gas-barrier layer and an outer abuse layer; a first tie layer between the inner and the barrier layer and a second tie layer between the barrier and the outer abuse layer, may also be present.

The sealing layer used in the heat-shrinkable film of the present invention may be any conventional heat-sealable layer. Such a layer may for example comprise an ethylene-propylene copolymer, an ethylene-butene-propylene terpolymer, VLDPE, LLDPE, homogeneous ethylene-alpha-olefins, ethylene vinyl acetate copolymer, a ionomer (for example Surlyn™), ethylene acrylic acid copolymer, ethylene methacrylic acid copolymer, ethylene butyl acrylate copolymer, ethylene-alkyl acrylate-maleic anhydride terpolymer and the like polymers.

In a preferred embodiment, an ethylene-propylene copolymer, an ethylene-butene-propylene terpolymer, or a VLDPE heat-sealable layer is used.

The outer abuse resistant layer in the heat-shrinkable film of the present invention may be any conventional type of such layer, for example an ethylene vinyl acetate copolymer, ionomer (e.g. Surlyn™), polyamide, VLDPE, LLDPE, or EMAA layer. In a particularly preferred embodiment the outer abuse layer is an ethylene-vinyl acetate copolymer or a polyamide layer.

It will be understood that blends of resins may be used in place of individual resins in the various layers of the films of the invention, particularly in the sealing and outer abuse layers.

In the heat-shrinkable film according to the present invention, the inner layer which must be present, may for example be an ethylene-vinyl acetate copolymer, ethylene-butyl acrylate copolymer, an ethylene-methacrylate copolymer, an LLDPE, or a VLDPE. In a preferred embodiment said inner layer is an ethylene-vinyl acetate copolymer, an LLDPE or VLDPE layer. Additional inner layers may be present which may comprise the same or different polymers.

Gas-barrier layers are typically EVOH or PVDC layers wherein said layers comprise EVOH, optionally blended with polyamides, or PVDC, as defined above.

When two adjacent layers do not bond satisfactorily each other, adhesive or tie layers are generally employed. Said tie layers may comprise for example a modified polyolefin, such as a modified ethylene-vinyl acetate copolymer wherein the modifying agent is maleic anhydride.

The film according to the present invention may be irradiated with high energy electrons up to 16 Mrad in order to cause cross-linking and improve the mechanical properties thereof.

More preferably the level of radiation is of from about 1 to about 12 Mrad.

Example of shrinkable films which may benefit from this invention by incorporating aluminum powder, preferably with mica and titanium dioxide, in an inner or in the outer abuse layer(s) are disclosed in e.g. U.S. Pat. No. 4,469,742, U.S. Pat. No. 4,640,856, EP-A-0 217 252, EP-A-0 251 770, EP-0 369 808, EP-0 485 847 and European patent application 92830555.6, the contents of which are incorporated herein by reference.

A typical structure of a thermoformable film according to the present invention will comprise a sealing layer, an inner layer, optionally a gas-barrier layer and an outer abuse layer. Also in this case tie layers may be present as well as additional layers with specific purposes, such as layers aimed at provinding an easy opening of the package, or additional inner layers to increase the bulk of the structure or improve its mechanical properties.

In such general thermoformable structure, the sealing layer may be any conventional heat-sealable layer as defined above, and preferably an EVA or an LDPE or a ionomer layer; the outer abuse-resistant layer may be for instance a polyolefin, e.g. EVA or HDPE or LDPE or polypropylene, a ionomer, a polycarbonate, a polyamide, a polystyrene, a polyester; the inner layer which in the preferred embodiment is used to impart the desired rigidity to the thermoformable structure is generally based on polystyrene, polyester, or polypropylene.

The gas-barrier layer, if present, is as defined for the heat-shrinkable structure and preferably EVOH. In some cases, i.e. when the inner layer comprises a polyester and is sufficiently thick, the structure will have gas-barrier properties even in the absence of a separate gas-barrier layer.

The multilayer films of the present invention can be produced by conventional processes which comprise co-extruding the various resins through different extruders and passing the extrudate through a die, either round or flat, where the layers are joined and form a total coextrusion. The multilayer melt structure then exits the die lips and is cooled down. It may be desiderable to cross-link the structure to improve abuse or puncture-resistance and other physical characteristics thereof and when a heat-shrinkable film is desired it is necessary to orient it either monoaxially or, preferably, biaxially.

Processwise, cross-linking is preferably accomplished by irradiation with high energy electrons using apparatuses well known to those of skill in the art. The irradiation is usually carried out at a dosage up to about 16 MRad, typically between about 1 MRad and about 12 MRad. Alternatively cross-linking can be achieved by means of irradiation with UV radiation, X-rays, beta-particles and the like or chemically through utilisation of peroxides.

Orientation, when required, may be effected by the bubble technique when the extrusion is done through a round die or by tenterframe when the extrusion is done through a flat die. In the former case the extruded tubular tape which is obtained by quenching the melt structure exiting the die is collapsed, optionally cross-linked, and then passed through a hot water bath and, as it leaves the hot water, it is inflated and blown into thin tubing. In the latter case the melt sheet which exits the flat die is cooled down by calendering or quenched by using a chill roll or other known means, it is optionally crosslinked, and is then heated by passing over a heating zone and oriented by stretching it either mono-axially or biaxially and in this latter case either sequentially or simultaneously.

Alternatively instead of using the full coextrusion method the structures ot the present invention can be manufactured by conventional extrusion coating or lamination. In the former case one or more layers of the structure are extruded or co-extruded first (the substrate), optionally cross-linked, and then coated by extruding or co-extruding the remaining layers thereonto. In the latter case, two or more partial structures, which may optionally be cross-linked, are coupled by lamination typically using conventional adhesives, to form the desired end structure.

In order to get the structures according to the invention, the aluminum powder optionally mixed with mica platelets, and/or $TiO_2$ or titanium dioxide-coated mica platelets, of the suitable particle sizes and in the suitably selected amounts are carefully and uniformely dispersed into the resin(s) of the suitably selected inner and/or outer abuse layer(s). This is preferably done by blending the resin with a so-called masterbatch, a concentrate of the above ingredients dispersed typically in the same resin. This blending step can be carried out before or during extrusion. The masterbatches are prepared by conventional techniques that typically involve griding the resin used as the masterbatch base, mixing it with all the other ingredients in powdered form using highly viscous liquids such as mineral oils, fatty acids, and fatty alcohols or waxes as dispersants, extruding through a die having a large number of holes using a double screw extruder and pelletizing the thus obtained strands.

The masterbatch optionally contains also a minor portion of antiblocking agents, such as silicon dioxide, to prevent sticking effects.

Furthermore it may contain also minor amounts of other conventional additives such as antioxidizers, stabilizers, and the like additives, if necessary or advisable.

Said masterbatches will typically comprise from about 2 to about 15%, preferably from about 3 to about 10%, of aluminium powder.

In a preferred embodiment said masterbatches will also comprise mica and/or titanium dioxide or titanium dioxide-coated mica platelets in an overall amount of from about 20 to about 60%, preferably from about 30 to about 50%.

The microwaveable multilayer film with metal-like appearance of this invention may be used according to conventional techniques.

When the film of this invention is heat-shrinkable, it is wrapped around an article, or said article is introduced into a receptacle formed from said film, such as a tubular casing, a pounch or a bag, the receptacle is vacuumized if necessary, the open end(s) of the receptacle are sealed or clipped and the package is shrunk.

When the film of this invention is thermoformable, it is vacuum or compressed air formed, an article or a food product is placed in the cavity thus obtained and either a substantially non-forming web is disposed over the cavity and the package is sealed under vacuum or under modified atmosphere or a highly forming web is moulded down upon and around the product and sealed against the thermoformed rigid support.

DESCRIPTION OF THE PREFERRED EMBODIMENTS

Figure 1:
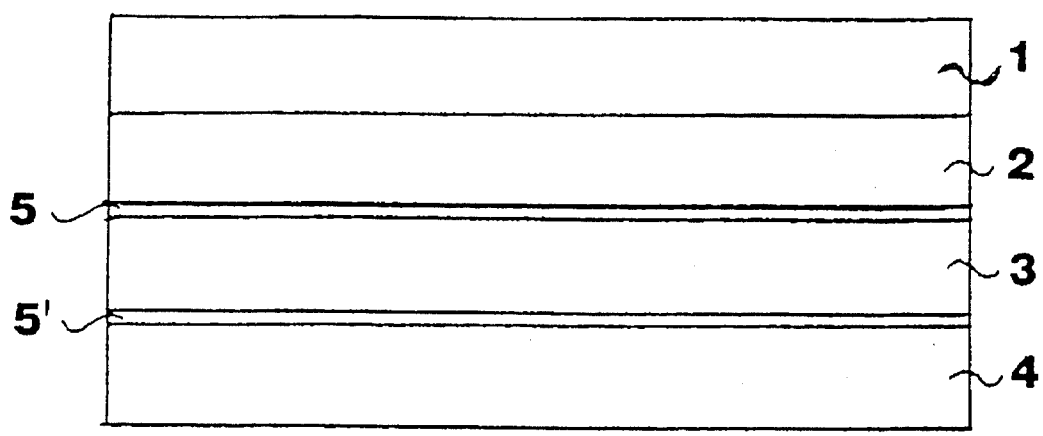
FIG. 1 is a cross sectional view of a preferred embodiment of this invention consisting of a four layered heat shrinkable barrier microwaveable film having metal-like appearance.

Referring to FIG. 1, which is a sectional view of a four layered preferred embodiment of this invention, it is seen that this embodiment comprises sealant layer 1, inner layer 2, barrier layer 3 and outer abuse layer 4. Suitable tie layer(s) 5 and/or 5' may be present to improve adhesion when desired.

Preferably, the sealant layer 1, of the film comprises a propylene copolymer e.g. a propylene-ethylene copolymer or propylene-ethylene-butene terpolymer wherein the monomers ratio is of from 98:2 to 90:10 as percent by weight, an ethylene-alkyl acrylate-maleic anhydride terpolymer or a VLDPE.

The inner layer 2, is preferably made of EVA wherein the monomers ratio is of from 70:30 to 95:5 as percent by weight, LLDPE or VLDPE.

In a preferred embodiment, this inner layer 2 will comprise from about 0.1 to about 1.5% by weight calculated on the weight of the overall structure (w/w) of aluminum powder, up to about 0.1% (w/w) of mica platelets and/or up to about 2% of titanium dioxide, or up to about 6% by weight of titanium dioxide-coated mica platelets.

Typically, the thickness of the inner layer 2 is of from about 20% to about 60% of the total thickness of the film, and preferably from about 25 to about 40%.

The barrier layer 3 is made of PVDC or, preferably, of EVOH.

The outer abuse layer 4, is preferably made of EVA wherein the monomers ratio is of from 70:30 to 97:3 as percent by weight.

The outer abuse layer 4 may also be made of a copolyamide 6/12 (caprolactam-laurolactam) wherein the monomers ratio is of from 40:60 to 70:30 as percent by weight.

The preferred embodiment of FIG. 1, may further comprise two adhesive layers 5 and 5', otherwise known as tie layers, preferably made of modified EVA or modified LLDPE type of resins.

The first tie layer 5 is interposed between the inner layer 2 and the barrier layer 3 while the second tie layer 5' is interposed between the barrier layer 3 and the outer abuse layer 4.

Advantageously, the total structure or only some layers thereof are cross-linked by radiation with high energy electrons.

Figure 2:
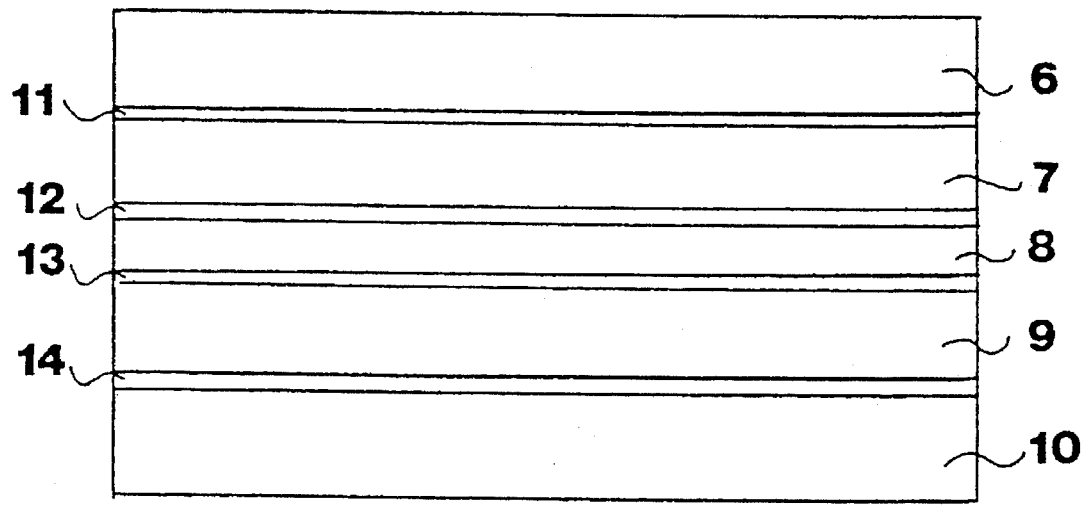
FIG. 2 is a cross sectional view of a further preferred embodiment of this invention consisting of a five layer barrier microwaveable thermoformable structure having metal-like appearance.

Referring to FIG. 2, this embodiment comprises sealant layer 6, inner layer 7, barrier layer 8, another inner layer 9, and an outer abuse layer 10. Suitable tie layers 11, 12, 13, 14 may be present, if necessary to improve adhesion.

In this embodiment, sealant layer 6 preferably comprises EVA, LDPE or a ionomer.

The inner layers 7 and 9, which may be equal or different, comprise polyester or polystyrene resins; an aluminum powder and optionally mica, and/or titanium dioxide, is added to at least one inner layer 7 and 9, in the amounts indicated above.

More preferably, inner layers 7 and 9 are equal and the aluminum powder and optionally mica, and/or titanium dioxide, is added to both inner layers 7 and 9.

The barrier layer 8 will preferably comprise EVOH.

The outer abuse layer 10 preferably comprises polypropylene, polyamide, polycarbonate, ionomer, or polyester.

In the case of thermoformable structures, which are generally much thicker than the heat-shrinkable ones, the thickness of the combined inner layers 7 and 9 may range from about 25 to about 80% of the total thickness.

This invention may be further understood by reference to the following specific examples.

EXAMPLE 1

A film having the following structure was fully coextruded, irradiated to 7.5 Mrad and oriented (stretching ratio: 2.8 in machine direction and 3.15 in cross-direction) with the air bubble technique. This film is suitable for cook-in packages.

Film Structure

Sealing layer, thickness 13 microns approximately, propylene copolymer (propylene/ethylene/butene 94/4/2 as % by weight), MFI=5.0 g/10', d=0.900 g/ml$^3$; Melting Point=128°–132° C. (DSC).

Inner layer, thickness 22 microns approximately, EVA (VA=12% by weight), MFI=2.5 g/10', d=0.933 g/ml$^3$; Melting Point=96° C. (DSC).

Tie layer, thickness 4 microns approximately, modified EVA (VA=28% by weight) containing ethylene/propylene/diene resin (Bynel™ cxa 3062, DuPont).

Barrier layer, thickness 4 microns, approximately, EVOH (ethylene content=about 44% by weight), MFI=5.5 g/10', d=1.140 g/ml$^3$; Melting Point=166° C. (DSC).

Tie layer, thickness 4 microns approximately, modified EVA (VA=28% by weight) containing ethylene/propylene/diene resin.

Outer abuse layer, thickness 6 microns approximately, EVA (VA=6.5% by weight), MFI=2.5 g/10', d=0.926 g/ml$^3$; Melting Point=103° C. (DSC).

The metal-like appearance was obtained by incorporating into the film forming composition of the inner layer 30% (w/w) of a masterbatch comprising about 3% (w/w) of aluminum powder in finely-divided form, less than 1% of mica particles and about 9% (w/w) of titanium oxide (w/w) in EVA (VA=6%) plus minor amounts of silicon dioxide and dispersant additives such as waxes and fatty acids.

The amount of aluminum powder was about 0.33% of the total weight of the film.

EXAMPLE 2

A second film was manufactured as described in Example 1 above except that the amount of the masterbatch added to the film forming composition of the inner layer was 40% (w/w) instead of 30%.

The amount of aluminum powder was about 0.44% of the total weight of the film.

EXAMPLE 3

A third film was manufactured as described in Example 1 above except that the amount of the masterbatch added to the film forming composition of the inner layer was 50% (w/w) instead of 30%.

The amount of aluminum powder was about 0.55% of the total weight of the film.

EXAMPLE 4

A fourth film was manufactured as described in Example 2 above except that the polymer of the abuse layer was a nylon 6/12 copolymer containing 60% of laurolactam instead of EVA.

The amount of aluminum powder was about 0.52% of the total weight of the film.

COMPARATIVE EXAMPLE 1

A conventional laminate comprising an aluminum foil was manufactured according to conventional techniques.

The structure of the laminate was as follows:

First layer, thickness 50 microns approximately, LLDPE (d=0.915 g/ml—MFI about 2 g/10'), Second layer, thickness 23 microns approximately, Ionomer (zinc salt)

Third layer, thickness 9 microns approximately, Aluminum foil;

Fourth layer, thickness 15 microns approximately, LDPE (d=0.918 g/ml—MFI 5 g/10'), Fifth layer, thickness 12 microns approximately, Poly(ethylene terephtalate) coated with 4.4% (w/w) of a polyurethane primer.

COMPARATIVE EXAMPLE 2

A conventional laminate comprising a metallized substrate was manufactured according to conventional techniques.

The structure of the laminate was as follows:

First layer, thickness 70 microns approximately, LLDPE (d=0.915 g/ml—MFI about 2 g/10'), Second layer, thickness 14 microns approximately, LDPE (d=0.918 g/ml—MFI 5 g/10'), Third layer, thickness 12 microns approximately, Poly(ethylene terephtalate) coated with 4.4% (w/w) of a polyurethane primer; and coated under vacuum with a layer of aluminum particles.

COMPARATIVE TESTS

Aluminum percentage was tested by X-Ray fluorescence and X-Ray diffraction.

Shrink percentage was tested according to ASTM D 2372 in both longitudinal (L) and transverse (T) directions.

Gloss was tested according to ASTM D 2457-90.

Oxygen gas permeability was tested according to ASTM D 3985.

Microwaveability was tested with a microwave oven BOSCH™ MG 820, power 720 W, operating with 4 levels of power (¼, 2/4, ¾, full power).

The results are shown in Table I.

TABLE I

| Test | Example | | | | Comparative Example | |
|---|---|---|---|---|---|---|
| | 1 | 2 | 3 | 4 | 1 | 2 |
| % Al (inner layer) | 0.9 | 1.2 | 1.5 | 1.2 | 100 | 100 |
| % Al total | 0.33 | 0.44 | 0.55 | 0.52 | 19.5 | 0.3 |
| % shrink at 85° C. (L) | 22 | 21 | 20 | 23 | NO | NO |
| % shrink at 85° C. (T) | 33 | 32 | 30 | 34 | NO | NO |
| $O_2$ permeability ml/days · sqm · bar | 10 | 10 | 10 | 10 | <5 | 5 |
| Gloss | 78 | 76 | 75 | 85 | 109 | >155 |
| % U.V. absorption | >99 | >99 | >99 | >99 | >99 | >99 |
| Microwaveability | YES | YES | YES | YES | NO | NO |

EXAMPLE 5

A thermoformable film having the structure indicated below was fully coextruded on a flat line to an overall thickness of about 280 microns and then thermoformed by the vacuum forming method:

Sealing layer, thickness 15 microns approximately, Ethylene-vinyl acetate copolymer (9% vinyl acetate units)

Tie layer, thickness 8 microns approximately, modified ethylene-vinyl acetate copolymer Inner layer, thickness 100 microns approximately, Blends of polystyrenes Tie layer, thickness 8 microns approximately, modified ethylene-vinyl acetate copolymer Barrier layer, thickness 6 microns approximately, EVOH (ethylene content=about 44% by weight)

Tie layer, thickness 8 microns approximately, modified ethylene-vinyl acetate copolymer Inner layer, thickness 100 microns approximately, Blends of polystyrenes Tie layer, thickness 8 microns approximately, modified ethylene-vinyl acetate copolymer Outer abuse layer, thickness 25 microns approximately, Poly(1,4-cyclohexylene terephthalate)

The metal-like appearance was obtained by incorporating into each of the two inner layers 5% (w/w) of a masterbatch having the same composition as in Example 1.

The amount of aluminum powder was therefore about 0.1% by weight of the total structure.

The structure showed to be fully microwaveable.

EXAMPLE 6

The same film as that of Example 1 was manufactured and the silver-like appearance was obtained by incorporating into the film forming composition of the inner layer 30% (w/w) of a masterbatch comprising about 3% (w/w) of aluminum powder (particle size distribution: 90% less than 18 microns, 50% less than 7 microns) and about 30% of titanium dioxide-coated mica platelets (particle size: less than 15 microns), in EVA (VA=6%) plus minor amounts of dispersant additives.

The amount of aluminum powder was about 0.33% by weight of the total weight of the film.

Shrink, barrier and optical properties of the obtained structure were comparable to those reported in Table I for the film of Esample 1.

Also, the structure showed to be fully microwaveable.

EXAMPLE 7

A tubular film having substantially the same structure as that described in Example 6 where, however, the sealing layer was made of an ionomer instead of a propylene copolymer, the overall thickness was 80 microns and the thickness of the inner layer was 24 microns, was fully coextruded, irradiated to about 4 MRad and biaxially oriented.

A gold-like appearance was obtained by incorporating into the film forming composition of the inner layer 25% (w/w) of a masterbatch comprising about 6% of aluminum powder (particle size distribution: 90% less than 18 microns, and 50% less than 7 microns), about 40% of titanium dioxide-coated mica platelets having a particle size of less than 15 microns, and about 3% of a blend of yellow and red organic pigments in EVA (VA=6%) plus minor amounts of silicon dioxide and dispersant additives. The amount of aluminum was about 0.5% by weight of the total weight of the film.

What is claimed is:

1. A microwaveable multilayer film with metallic appearance, comprising at least:

a) a sealing layer, b) an interior layer, and c) an outer abuse layer, wherein the film comprises from about 0.05 to about 2.5% by weight, based on the total weight of the film, of aluminum powder in finely divided form, dispersed in at least one layer selected from the interior and the outer abuse layers; and wherein the film is capable of being crossed by at least 70% of the microwaves generated by a microwave oven without negatively interfering therewith.

2. A film according to claim 1, wherein the film further comprises a gas barrier layer disposed between the interior layer and either of the interior or outer abuse layers respectively.

3. A film according to claim 1, wherein the film comprises from about 0.1 to about 1.5% by weight of aluminum powder.

4. A film according to claim 1, wherein the film further comprises up to about 2% by weight, based on the total weight of the film, of mica platelets, dispersed in at least one layer selected from the interior and the outer abuse layers.

5. A film according to claim 1, wherein the film further comprises up to about 8% by weight, based on the total weight of the film, of titanium dioxide, dispersed in at least one layer selected from the interior and the outer abuse layers.

6. A film according to claim 1, wherein the film further comprises up to about 15% by weight, based on the total weight of the film, of titanium dioxide-coated mica platelets, dispersed in at least one layer selected from the interior and the outer abuse layers.

7. A film according to claim 6, wherein the amount of titanium dioxide-coated mica platelets is of from 1 to 10% by weight.

8. A film according to claim 6, wherein the particle size of the titanium dioxide-coated mica platelets is less than 20 microns.

9. A film according to claim 6, wherein the film further comprises up to 2.5% by weight, based on the weight of the overall structure, of one or more organic pigments, dispersed in at least one layer selected from the interior and the outer abuse layers.

10. A film according to claim 1, wherein the aluminum powder is incorporated into the interior layer.

11. A film according to claim 10, wherein the interior layer comprises ethylene vinyl acetate copolymer.

12. A film according to claim 1 wherein the film is cross-linked.

13. A film according to claim 1, wherein said film is thermoformable.

* * * * *

UNITED STATES PATENT AND TRADEMARK OFFICE
CERTIFICATE OF CORRECTION

PATENT NO. :   5,622,780
DATED      :   April 22, 1997
INVENTOR(S) :  Mario Paleari It is certified that error appears in the above-identified patent and that said Letters Patent is hereby corrected as shown below:

At Column 14, in claim 2, line 3, delete "interior", substituting therefor --sealing--.

Signed and Sealed this

Twenty-sixth Day of August, 1997

*Attest:*

BRUCE LEHMAN

*Attesting Officer*  *Commissioner of Patents and Trademarks*